(12) United States Patent
Chang et al.

(10) Patent No.: US 10,685,026 B2
(45) Date of Patent: Jun. 16, 2020

(54) DATABASE QUERY BASED MATCH ENGINE

(71) Applicant: SAP SE, Walldorf (DE)

(72) Inventors: Hui Chang, Shanghai (CN); Yu Jian Zhan, Shanghai (CN)

(73) Assignee: SAP SE, Walldorf (DE)

( * ) Notice: Subject to any disclaimer, the term of this patent is extended or adjusted under 35 U.S.C. 154(b) by 371 days.

(21) Appl. No.: 15/485,090

(22) Filed: Apr. 11, 2017

(65) Prior Publication Data

US 2018/0293319 A1   Oct. 11, 2018

(51) Int. Cl.
 *G06F 16/245*   (2019.01)
 *G06F 16/2457*  (2019.01)

(52) U.S. Cl.
 CPC ................ *G06F 16/2457* (2019.01)

(58) Field of Classification Search
 CPC ............ G06F 16/2457; G06F 16/2425
 See application file for complete search history.

(56) References Cited

U.S. PATENT DOCUMENTS

| | | | |
|---|---|---|---|
| 4,490,848 A | 12/1984 | Beall et al. | |
| 5,495,567 A | 2/1996 | Iizawa et al. | |
| 5,511,116 A | 4/1996 | Shastry | |
| 8,868,537 B1* | 10/2014 | Colgrove | G06F 16/951 707/706 |
| 9,235,654 B1 | 1/2016 | Gupta et al. | |
| 9,805,071 B1* | 10/2017 | Ellis | G06F 16/214 |
| 2005/0076015 A1* | 4/2005 | Dettinger | G06F 16/9032 |
| 2012/0117076 A1* | 5/2012 | Austermann | G06F 16/2228 707/741 |
| 2012/0253951 A1* | 10/2012 | Gupta | G06Q 30/02 705/14.73 |
| 2013/0282704 A1* | 10/2013 | Pantel | G06F 16/9535 707/723 |
| 2013/0332401 A1 | 12/2013 | Muraoka et al. | |

(Continued)

OTHER PUBLICATIONS

Definition of: Terminal Services date unknown [captured on Dec. 26, 2018], Hyperlink "http://pcmag.com" \h pcmag.com, Hyperlink "https://www.pcmag.com/encyclopedia/term/" \h https://www.pcmag.com/encyclopedia/term/52755/terminal-services.

(Continued)

*Primary Examiner* — Alicia M Willoughby
(74) *Attorney, Agent, or Firm* — Mintz Levin Cohn Ferris Glovsky and Popeo, P.C.

(57) ABSTRACT

A method may include: generating a database query to retrieve a first set of records from a database, the database query retrieving the first set of records by filtering, based on a target value, records held at the database, the records being associated with at least one attribute; selecting a subset of records from the first set of records, the selecting based on an attribute associated with the first set of records; modifying the target value in response to the attribute associated with the subset of records failing to satisfy a threshold value; executing a modified database query to retrieve a second set of records from the database, the modified database query retrieving the second set of records by filtering, based on the modified target value, the records at the database; and generating a user interface configured to display a result of the database query and/or the modified database query.

16 Claims, 7 Drawing Sheets

(56) References Cited

U.S. PATENT DOCUMENTS

| | | | |
|---|---|---|---|
| 2015/0161202 A1* | 6/2015 | Shapira | G06F 16/2425 |
| | | | 707/723 |
| 2015/0310527 A1* | 10/2015 | Warren | G06Q 30/0625 |
| | | | 705/26.62 |
| 2016/0070757 A1* | 3/2016 | Liang | G06F 16/24553 |
| | | | 707/718 |
| 2017/0270159 A1* | 9/2017 | Wang | G06F 16/243 |
| 2017/0277747 A1* | 9/2017 | Tremayne | G06F 16/2425 |
| 2018/0025059 A1* | 1/2018 | Batchu | G06F 16/24564 |
| | | | 707/740 |
| 2018/0181606 A1* | 6/2018 | Chu | G06F 16/2282 |

OTHER PUBLICATIONS

Parasuraman et al., "A Model for Types and Levels of Human Interaction with Automation," IEEE Transactions on Systems, Man, and Cybernetics—Part A: Systems and Humans, vol. 30, pp. 286-297.

SQL Server Solutions, How to use The SQL Query Designer Dec. 5, 2015, Youtube, Hyperlink "https://www.youtube.com/watch?v=Fo53cx1JxvQ" \h https://www.youtube.com/watch?v=Fo53cx1JxvQ.

Oxford English Dictionary, Profile, date unknown, Retrieved from: https://oed.com/view/Entry/152087?rskey=rjeNH0&result=1&isAdvanced=false#eid.

Howe, database Nov. 5, 2017, Free On-line Dictionary of Computing, Retrieved from: http://foldoc.org/database.

\* cited by examiner

DATABASE QUERY BASED MATCH ENGINE

TECHNICAL FIELD

The subject matter described herein relates generally to database processing and more specifically to database query based matching.

BACKGROUND

A database may be configured to store a plurality of electronic data records. These data records are organized, in accordance with a database schema, into various database objects including, for example, one or more database tables. The database is coupled with a database management system (DBMS) that supports a variety of operations for accessing the data records held in the database. These operations may include, for example, structure query language (SQL) queries.

SUMMARY

Systems, methods, and articles of manufacture, including computer program products, are provided for a multi-dimensional controller. In one aspect, there is provided a method. The method may include: generating, by a controller, a database query to retrieve a first set of records from a database, the database query configured to retrieve the first set of records by at least filtering, based on a target value, a plurality of records held at the database, the plurality of records being associated with at least one attribute; selecting, by the controller, a subset of records from the first set of records, the selecting based at least on an attribute associated with the first set of records; modifying, by the controller, the target value, the target value being modified in response the attribute associated with the subset of records failing to satisfy a threshold value; generating, by the controller, a modified database query that includes the modified target value, the modified database query being configured to retrieve a second set of records from the database, the second set of records being retrieved by at least filtering, based on the modified target value, the plurality of records held at the database; and generating, by the controller, a user interface configured to display a result of the database query and/or the modified database query.

In some variations, one or more features disclosed herein including the following features can optionally be included in any feasible combination. The target value may be a single value, and the database query may be configured to retrieve the first set of records based at least on another attribute associated with the first set of records being greater than the single value. The modified target value may be an interval of values, the interval of values being generated to include the single value.

In some variations, the target value may be an interval of values, and the database query may be configured to retrieve the first set of records based at least on another attribute associated with the first set of records having an overlap with the interval of values. The modified target value may be an expanded interval of values, the expanded interval formed by at least decreasing a lower bound of the interval of values and/or increasing an upper bound of the interval of values.

In some variations, the subset of records may be further selected based on a similarity index associated with the first set of records, and the similarity index may correspond to an amount of the overlap between the other attribute associated with the first set of records and the interval of values. The similarity index may be determined by at least: determining a quantity of values that appear in both the other attribute associated with the first set of records and the interval of values; determining a total quantity of values in the other attribute associated with the first set of records and in the interval of values; and determining, based at least on the quantity of values and the total quantity of values, the similarity index for the first set of records. The subset of records may be selected by at least weighing, based on a corresponding similarity index, the attribute associated with the first set of records.

In some variations, the threshold value may include a minimum and/or a maximum value for the attribute associated with the subset of records. The controller may be implemented as a cloud service accessible to a first client and a second client. The first client may access a first instance of the controller and the second client may access a second instance of the controller.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to web application user interfaces, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

In some implementations, a controller may be configured to generate one or more user interfaces for presentation at a user device. For example, the controller may generate, for presentation at the user device, a user interface that is configured to enable an input of a target value. This target value may be a single value and/or an interval of values. In response to receiving the target value via the user interface, the controller may be configured to query a database based on the target value. For example, the controller may generate, based on the target value, one or more structured query language (SQL) statements that query the database for records matching the target value.

Figure 1:
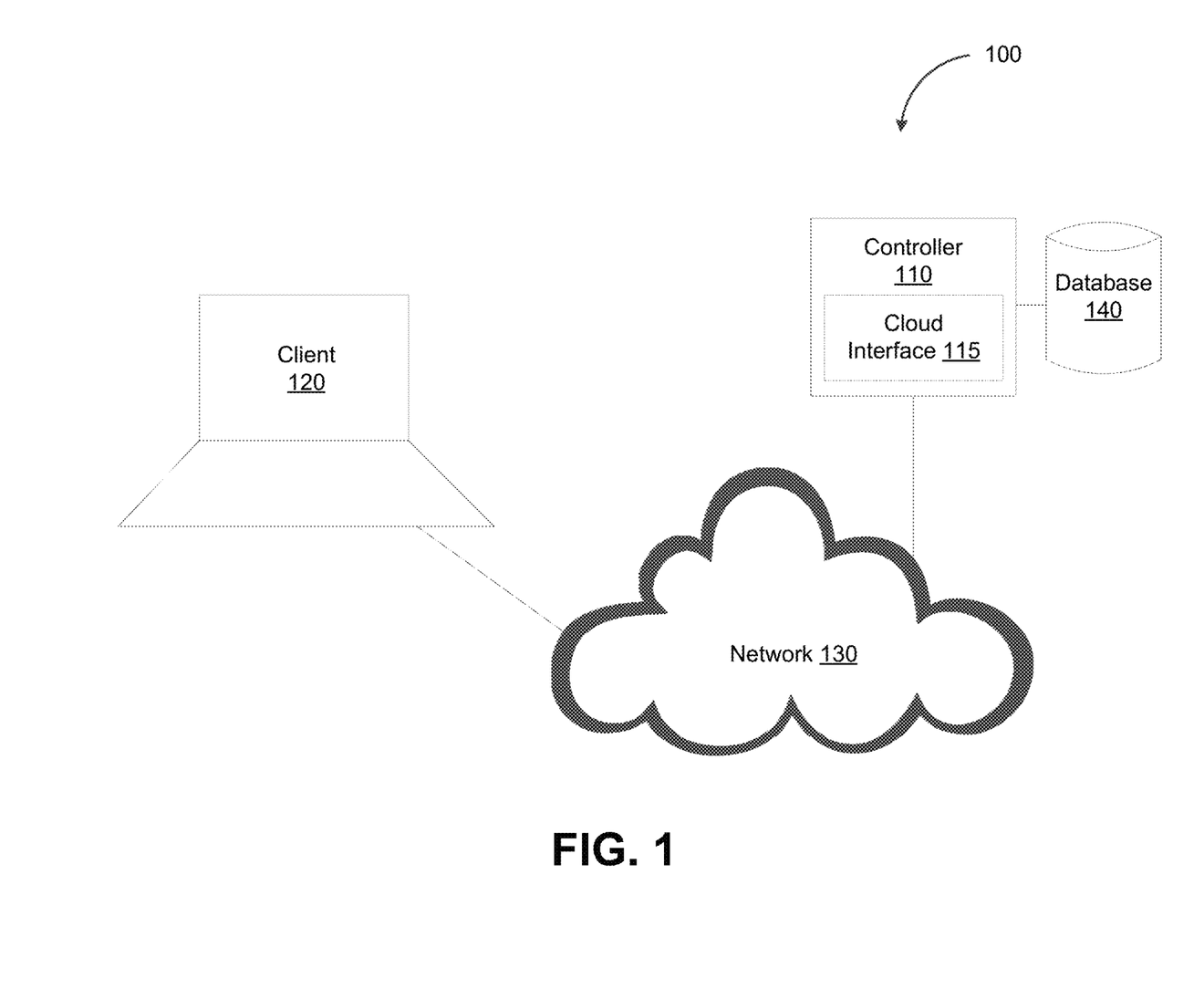
FIG. 1 depicts a block diagram illustrating a system, in accordance with some example embodiments.

FIG. 1 depicts a block diagram illustrating a system 100, in accordance with some example embodiments.

The system 100 may include a client 120, which may be a cellular phone, smart phone, a tablet, a laptop computer, a desktop, a workstation, and/or any other type of processor and memory based device. The client 120 may couple to a controller 110 via a wired and/or wireless network 130, such as a local area network (LAN), a wide area network (WAN), and/or the Internet. The controller 110 may be configured to identify records that match a target value by at least querying a database 140 that is communicatively coupled to the controller 110. The database 140 may include a database management system (DBMS) that is coupled with an in-memory database, a relational database, and/or any other types of persistence.

The database 140 may store a plurality of records that may be accessed via one or more database queries such as, for example, SQL statements. The records held in the database 140 may correspond to the profiles of various user, such as mentors, and/or mentoring activities. For example, the profile of a mentor may include a plurality of attributes associated with the mentor including, for example, name, location, department, gender, and/or seniority. The profile of the mentor may further include a skill level and/or a competency range indicative of the mentor's proficiency with respect to a particular skill and/or competency. The profile of the mentor may also include a rating, which may be determined based on evaluations and/or feedback by one or more mentees. The profile for a mentoring activity may also include a plurality of attributes associated with the mentoring activity. For example, the profile of the mentoring activity may include a repeat rate, which may correspond to an average number of times the mentoring activity is repeated by the same participants. The profile of the mentoring activity may further include a skill level and/or a competency range that may be achieved by completing the activity.

As used herein, skills and competencies may be assessed based on different scales. For example, a skill may be evaluated using a single numerical value representative of a skill level. Meanwhile, a competency may be evaluated using an interval of numerical values representative of a competency range. However, it should be appreciated that skills and competencies may refer to any aptitude and may thus be used interchangeably. Furthermore, skill level and/or competency range may be represented using any type of values including, for example, numerical values, alphabetical values, and/or the like.

The controller 110 may update the records stored at the database 140. For example, the controller 110 may update a mentor profile to reflect changes to the mentor's skill level and/or competency range, which may occur as the mentor's skills and/or competencies improve. The mentor's profile may also be updated to reflect changes to the mentor's rating, which may occur as additional mentees evaluate the mentor. Alternately and/or additionally, the controller 110 may update an activity profile to reflect changes to the skill level and/or the competency range that may be achieved by completing the activity. This update may be based on an improvement in the skill level and/or competency range of mentees who participated in the activity, as reported by the mentees and/or observed by a third party (e.g., a supervisor). The controller 110 may also update the activity profile to reflect changes to the activity's repeat rate.

The controller 110 may be configured to identify records in the database 140, such as mentor profiles and/or activity profiles, based on a target value received from the client 120. The target value from the client 120 may be provided via, for example, the cloud interface 115. In some example embodiments, the controller 110 may identify records as part of an enterprise planning system, such as a human resources management system. For example, the controller 110 may identify mentor profiles and/or activity profiles that match the target value by at least applying one or more filters to the records held at the database 140. For example, the controller 110 may generate one or more database queries that filter the mentor profiles and/or activity profiles based on a value representative of a target skill level. Applying the filter may identify one or more mentor profiles and/or activity profiles with a skill level that is equal to and/or greater than the value corresponding to the target skill level. Alternately and/or additionally, the controller 110 may generate one or more database queries to filter the mentor profiles and/or activity profiles based on an interval of values representative of a target competency range. Applying the interval-based filter may identify one or more mentor profiles and/or activity profiles with a competency range that overlaps with the target competency range. The competency range may overlap with the target competency range if at least one value from the competency range also appears in the target competency range. According to some example embodiments, the controller 110 may further determine, for each mentor profile and/or activity profile with a competency range that overlaps with the target competency range, a similarity index that correspond to an amount of the overlap. For example, this similarity index may correspond to a quantity of values in the competency range that also appears in the target competency range.

The controller 110 may identify the most effective mentors and/or mentoring activities for achieving the target value specified by the client 120. As such, the controller 110 may identify a subset of mentor profiles and/or activity profiles based on the target value and further process the subset of profiles to identify a top k quantity of profiles. For example, the controller 110 may weigh the ratings of each mentor in a subset of mentor profiles based on the similarity index associated with each mentor. The rating associated with a mentor may correspond to an average score given to the mentor by one or more of the mentor's mentees. This average score may reflect the mentor's effectiveness, as evaluated by the mentor's mentees. Weighing the rating associated with the mentor may include multiplying the rating with the similarity index associated with the mentor. The controller 110 may further sort the subset of mentor profiles based on the weighed ratings of each mentor and select a k number of mentor profiles having the highest weighted ratings. Selecting mentor profiles based on weighed ratings may enable the controller 110 to identify and exclude mentors with high ratings but whose competency ranges have minimal overlap with the target competency range.

Alternately and/or additionally, the controller 110 may weigh the repeat rate of each mentoring activity in a subset of activity profiles based on the similarity index associated with each mentoring activity. The repeat rate associated with a mentoring activity may indicate an effectiveness of the mentoring activity because more effective mentoring activities may be repeated a fewer number of times than less effective mentoring activities. Weighing the repeat rate for each mentoring program may include multiplying the repeat rate with a corresponding similarity index indicative of an amount of overlap between the competency range of each mentoring activity and the target competency range. The controller 110 may further sort the subset of activity profiles based on the weighed repeat rate of each mentoring activity and select a k number of activity profiles having the lowest weighed repeat rates. Selecting activity profiles based on weighed repeat rates may enable the controller 110 to identify and exclude mentoring activity with low repeat rates but whose competency ranges have minimal overlap with the target competency range.

In some example embodiments, the controller 110 may determine whether the top k quantity of profiles satisfy a threshold value. For example, the controller 110 may determine whether the ratings associated with the top k quantity of mentor profiles exceed a minimum rating. The controller 110 may also determine whether the repeat rates associated with the top k quantity of activity profiles are below a maximum repeat rate. In the event that none of the top k quantity of profiles satisfies the threshold value, the controller 110 may generate a modified database query to retrieve additional records from the database 140. The modified database query may be generated using an expanded target value. For example, the controller 110 may expand a target skill level originally specified by the client 120 to from a single value to a range of values. Alternately and/or additionally, the controller 110 may expand a target competency range originally specified by the client 120 by at least decreasing the lower bound of the target competency range and/or increasing the upper bound of the target competency range. Modifying the database query in this manner may enable the controller 110 to retrieve, based on the expanded target value, a larger number of records.

In some implementations, the controller 110 may be implemented as a service, such as a cloud-based software-as-a-service (SaaS), and may be accessed via a cloud interface 115. In the case of a cloud-based implementation of the controller 110, a server may provide the SaaS to the client 120 via the network 140.

In some implementations, a plurality of controllers may be instantiated for a plurality of clients. For example, a first entity, such as company X, including one or more clients may access the cloud interface 115 and then be directed to an instance of the controller 110 and the database 140, while a second entity, such as company Y, including one or more clients may access the cloud interface 115 and then be directed to another instance of the controller 110 and the database 140. In this example, the cloud interface 115 may couple to, or include a hypervisor to instantiate a virtual machine hosting each instance of the controller 110 and/or the database 140. The virtual machines may provide a sandbox providing privacy to the data being handled for each entity.

Figure 2:
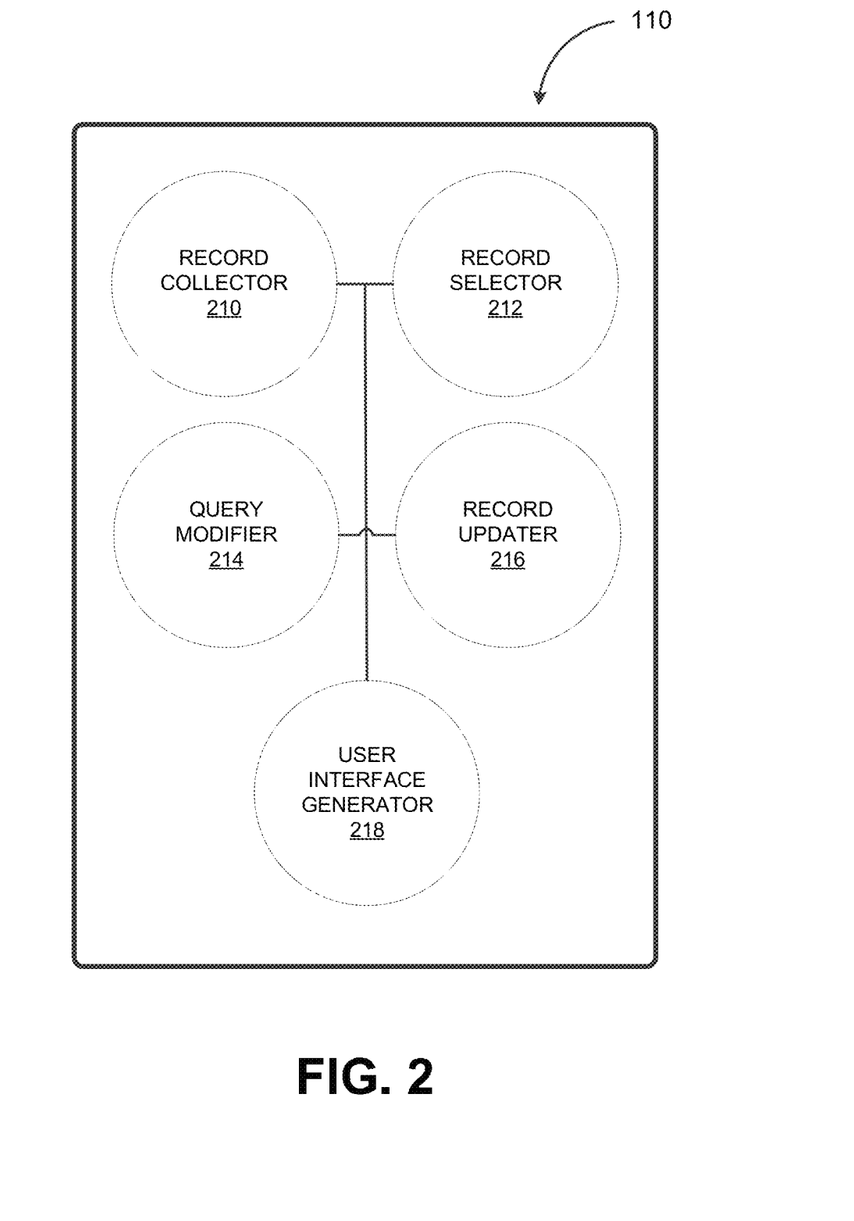
FIG. 2 depicts a block diagram illustrating a controller, in accordance with some example embodiments.

FIG. 2 depicts a block diagram illustrating the controller 110, in accordance with some example embodiments. Referring to FIGS. 1-2, the controller 110 may include a record collector 210, a record aggregator 212, a query modifier 214, a record updater 216, and a user interface generator 218.

The record collector 210 may be configured to query the database 140 to at least retrieve one or more records based on a target value received from the client 120. For example, the record collector 210 may generate database queries that apply, based on the target value, a numerical-based filter and/or an interval-based filter to the records held in the database 140. In some example embodiments, the target value may be a numerical value that represents a target skill level. As such, the record collector 210 may generate database queries that filter the records held at the database 140 to retrieve one or more mentor profiles and/or activity profiles having a skill level that exceeds the target skill level. Alternately and/or additionally, the target value may be an interval that represents a target competency range. Here, the record collector 210 may generate database queries that filter the records held at the database 140 to retrieve one or more mentor profiles and/or activity profiles having a competency range that overlaps the target competency range.

To further illustrate, Table 1 below depicts pseudo program code for retrieving profiles of activities based on a target competency range. Referring to Table 1, the record collector 210 may retrieve an activity profile based on an overlap between the target competency range and the competency range that may be achieved by completing the activity. As noted earlier, the profile of a mentoring activity may include an attribute for the competency range that may be achieved completing the mentoring activity. Thus, one or more activity profiles may be retrieved from the database 140 by at least comparing the lower bound and upper bound of the target competency range with the lower bound and the upper bound of the competency range included with the activity profiles held at the database 140.

TABLE 1

Select * from MentoringProgramSurvey where areaId = :tagetCompetencyId and endLevel > : targetStartLevel and startLevel < :targetEndLevel The record selector 212 may be configured to further process a subset of records that satisfy the target value. In some example embodiments, the record selector 212 may determine a similarity index for each mentor profile and/or activity profile retrieved by the record collector 210. As noted earlier, the record collector 210 may retrieve a mentor profile and/or an activity profile based on an overlap between a target competency range and the competency range associated with the mentor profile and/or the activity profile. Meanwhile, the record selector 212 may determine a similarity index for these mentor profiles and/or the activity profiles retrieved by the record collector 210. This similarity index may indicate an amount of overlap between the target competency range and the competency range associated with each of the mentor profile and/or activity profile retrieved by the record collector 210. For example, the record selector 212 may apply Equation (1) below to determine a similarity index $J_i$ for a profile i.

$$J_i = |A \cap B| / |A \cup B| \quad (1)$$

wherein A corresponds to the target competency range and B corresponds to the competency range of the profile i. The value $A \cap B$ may be an intersection between the target competency range A and the competency range B that corresponds to an amount of overlap between the target competency range A and the competency range B. As such, the value $A \cap B$ may be a union between the target competency range A and the competency range B correspond to a quantity of values in the competency range B of the profile i that is also in the target competency range A. Meanwhile, the value $A \cup B$ may be a measure of an overall size of a range that includes both the target competency range A and the competency range B. For example, the value $A \cup B$ may correspond to a total quantity of values that appear in both the target competency range A and the competency range B. Thus, as set forth in Equation (1), the similarity index $J_i$ may correspond to a ratio of an amount of overlap between the target competency range A and the competency range B and an overall size of these two ranges.

Table 2 below depicts pseudo program code for determining a similarity index for a subset of records retrieved by the record collector 210.

TABLE 2

```
for each (survey in filteredSurveys) {
    float start = survey.getStartLevel( ).floatValue( );
    float end = survey.getEndLevel( ).floatValue( );
    float interSectionStart = Math.max(start, startLevel0);
    float unionStart = Math.min(start, startLevel0);
    float interSectionEnd = Math.min(end, endLevel0);
    float unionEnd = Math.max(end, endLevel0);
    float similarity = (interSectionEnd – interSectionStart) / (unionEnd –
    unionStart);
    Add similarity to similarityList;
}
```

The record selector 212 may be configured to select at least some of the records retrieved by the record collector 210. For example, the record selector 212 may select one or more mentor profiles based on the weighed ratings of the mentor profiles retrieved by the record collector 210. The ratings associated with each mentor profile may be weighed based on the similarity index associated with each mentor profile. To further illustrate, the record selector 212 may not select a mentor profile with a high rating if that mentor profile's competency range has minimal overlap with the target competency range specified by the client 120. Alternately and/or additionally, the record selector 212 may select one or more activity profiles based on the weighed repeat rates of the activity profiles retrieved by the record collector 210. The repeat rate associated with each activity profile may be weighed based on the similarity index associated with each activity profile. As such, the record selector 212 may not select an activity profile with a low repeat rate if that activity profile's competency range has minimal overlap with the target competency range specified by the client 120.

In some example embodiments, the record selector 212 may select one or more mentor profiles by at least sorting the mentor profiles retrieved by the record collector 210 based on the weighed ratings of the mentor profiles. The record selector 212 may further select a top k quantity of mentor profiles having the highest weighed ratings. To further illustrate, Table 3 below depicts pseudo program code for selecting a top k quantity of mentor profiles based on the weighed rating of each mentor profile.

TABLE 3

```
Define a map to store Mentor and his/her weighted total score and
repeated counts for each survey in filteredSurveys {
    String mentorId = survey.getMentor( );
    float score = survey.getRate( );
    float similarity = get survey's calculated similarity;
    MentorResult result = map.get(mentorId);
    if (result != null) {
        result.setCount(result.getCount( ) + 1);
        result.setTotalScore(result.getTotalScore( ) + score * similarity);
    } else {
        map.put(mentorId, new MentorResult(mentorId, score *
        similarity, 1));
    }
}
```

Alternately and/or additionally, the record selector 212 may select one or more activity profiles by at least sorting the activity profiles retrieved by the record collector 210 based on the weighed repeat rates of the activity profiles. The record selector 212 may further select a top k quantity of activity profiles having the lowest weighed repeat rates. To further illustrate, Table 4 below depicts pseudo program code for selecting a top k quantity of activity profiles based on the weighed repeat rate of each activity profile.

TABLE 4

```
Define a map to store LearningActivity and its weighted repeated Count;
for each survey in filteredSurveys {
    float similarity = get survey's calculated similarity;
    for each (MentoringProgramLearningActivity act in
    survey.getActivities( )) {
        Float count = map.get(act);
        if (count != null) {
            map.put(act, count + similarity);
        } else {
            map.put(act, similarity);
        }
    }
}
```

The query modifier 214 may be configured to generate a modified database query when the records selected by the record selector 212 fail to satisfy a threshold value. For example, the record selector 212 may select a top k quantity of activity profiles based on the weighed repeat rate of each activity profile. However, none of the repeat rates associated with the top k quantity of activity profiles may be below a maximum repeat rate. Alternately and/or additionally, the record selector 212 may select a top k quantity of mentor profiles based on the weighed rating of each mentor profile. However, none of the ratings associated with the top k quantity of mentor profiles may exceed a minimum rating.

When none of the records selected by the record selector 212 satisfy a threshold value, the query modifier 214 may generate a modified database query that queries the database 140 based on an expanded target value. For example, the controller 110 may expand a target skill level specified by the client 120. The target skill level may be a single value such as, for example, a single numerical value, a single alphabetical value, and/or the like. As such, the target skill level may be expanded from a single value to a range of values. This range of values may include the single value that corresponds to the original target skill level specified by the client 120. Alternately and/or additionally, the controller 110 may expand a target competency range specified by the client 120 by at least decreasing the lower bound and/or increasing the upper bound of that competency range. Modifying the database query in this manner may enable the record collector 210 to retrieve, based on the expanded target value, a larger number of records. As such, the record selector 212 may subsequently be able to select a top k quantity of records that do satisfy the threshold value.

The record updater 216 may be configured to update at least some of the records held at the database 140. For example, the record updater 216 may be configured to update a mentor profile based on changes to the mentor's skill level, competency range, and/or rating. Alternately and/or additionally, the record updater 216 may be configured to update an activity profile based on changes to the mentoring activity's skill level, competency range, and/or repeat rate.

In some example embodiments, the user interface generator 218 may be configured to provide, to the client 120, one or more user interfaces such as, for example, graphic user interfaces (GUIs). For instance, the user interface generator 218 may provide user interfaces configured to receive, from the client 120, a target value that may be used for querying the database 140. Alternately and/or additionally, the user interface generator 218 may generate user interfaces for displaying at least a portion of the records selected by the record selector 212.

Figure 3A:
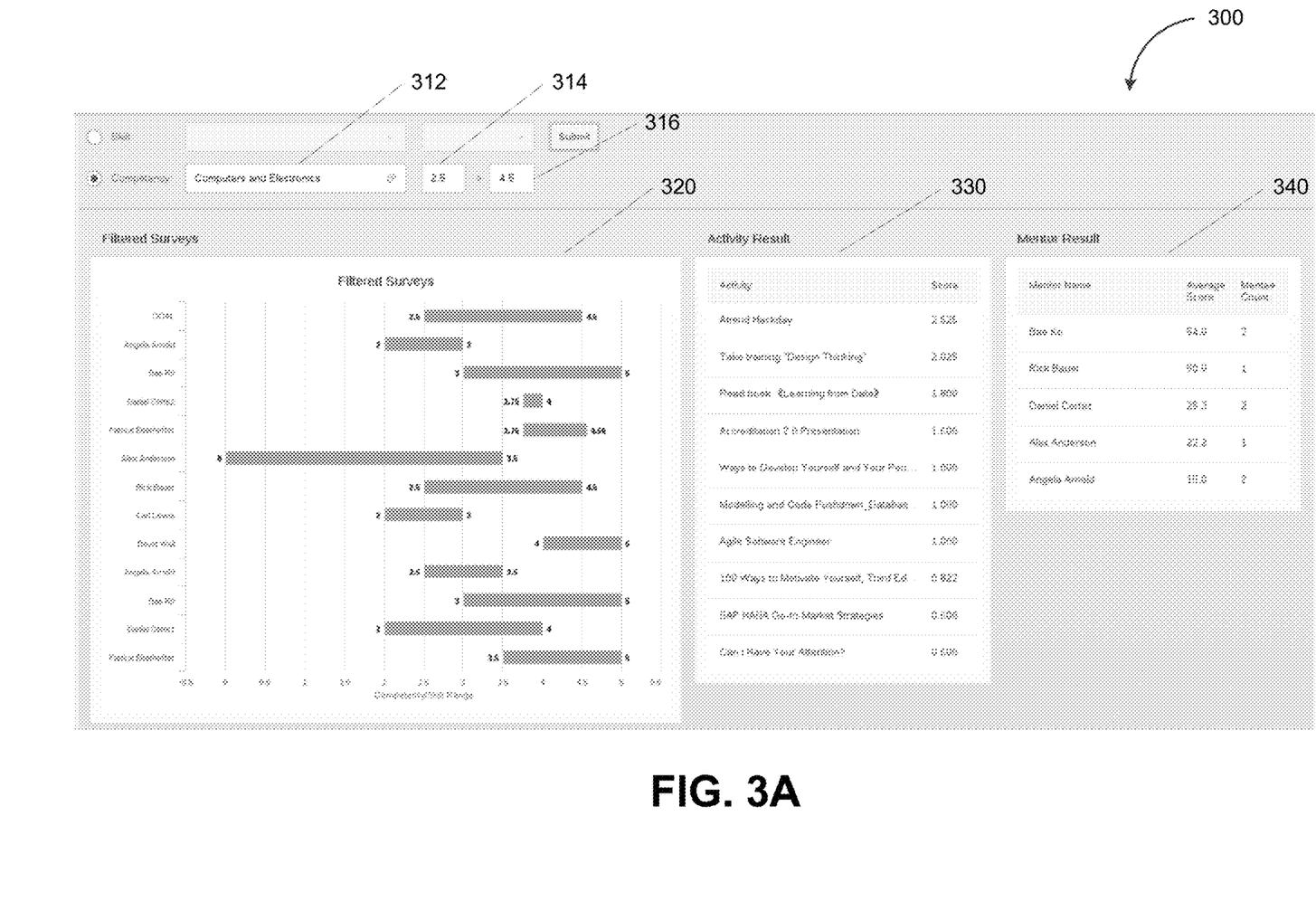
FIG. 3A depicts a user interface, in accordance with some example embodiments.

FIG. 3A depicts a user interface 300, in accordance with some example embodiments. Referring to FIGS. 1-2 and 3A, the controller 110 may generate the user interface 300 based on one or more of the records selected by the record selector 212. The controller 110 may generate the user interface 300 for display at the client 120. The controller 110 may generate the user interface 300 based on an input from the client 120 indicating a target competency range of 2.5-4.5 for the competency of Computers and Electronics. As shown in FIG. 3A, the user interface 300 may display mentors and mentoring activities that satisfy the target competency range of 2.5-4.5 for Computers and Electronics, which may be received from the client 120 via a first input box 312, a second input box 314, and/or a third input box 316. The first input box 312, the second input box 314, and the third input box 316 may implemented as text input boxes, dropdown menus, buttons, radio buttons, and/or the like.

The user interface 300 may include a filtered survey panel 320, an activity result panel 330, and a mentor result panel 340. The filtered survey panel 320 may display the competency range of at least some of the mentors and/or mentoring activities relative to the target competency range. For example, the controller 110 can generate one or more queries that filter the records stored at the database 140 for records of mentors and/or mentoring activities that satisfy the target competency range of 2.5-4.5 for Computers and Electronics. As shown in FIG. 3A, the filtered survey panel 320 may provide a visual indication of the overlap between the target competency range of 2.5-4.5 and the competency range of one or more mentors and/or mentoring activities.

The activity result panel 330 may display the mentoring activities that correspond to the activity profiles selected by the record selector 212. As noted earlier, the record selector 212 may select a top k quantity of activity profiles that satisfy the target competency range based on the weighed repeat rate of each mentoring activity. The repeat rate of a mentoring activity may correspond to an average number of times the mentoring activity is repeated by its participants. This repeat rate may be weighed based on a similarity index representative of an amount of overlap between the target competency range and the competency range achievable by completing the mentoring activity. It should be appreciated that by weighing the repeat rate of the mentoring activity with its similarity index, the activity result panel 330 may exclude an effective mentoring activity with a low repeat rate if the competency range of that mentoring activity has a very small overlap with the target competency range specified by the client 120.

The mentor result panel 340 may display the mentors that correspond to the mentor profiles selected by the record selector 212. According to some example embodiments, the record selector 212 may select a top k quantity of mentor profiles that satisfy the target competency range based on the weighed rating of each mentor. The rating of a mentor may correspond to an average rating given to the mentor by the mentor's mentees. This rating may be weighed based on a similarity index representative of an amount of overlap between the target competency range and the competency range associated with the mentor. It should be appreciated that by weighing the mentor's rating with the mentor's similarity index, the mentor result panel 340 may exclude an effective mentor with a high rating if the competency range of that mentor has a very small overlap with the target competency range specified by the client 120.

Figure 3B:
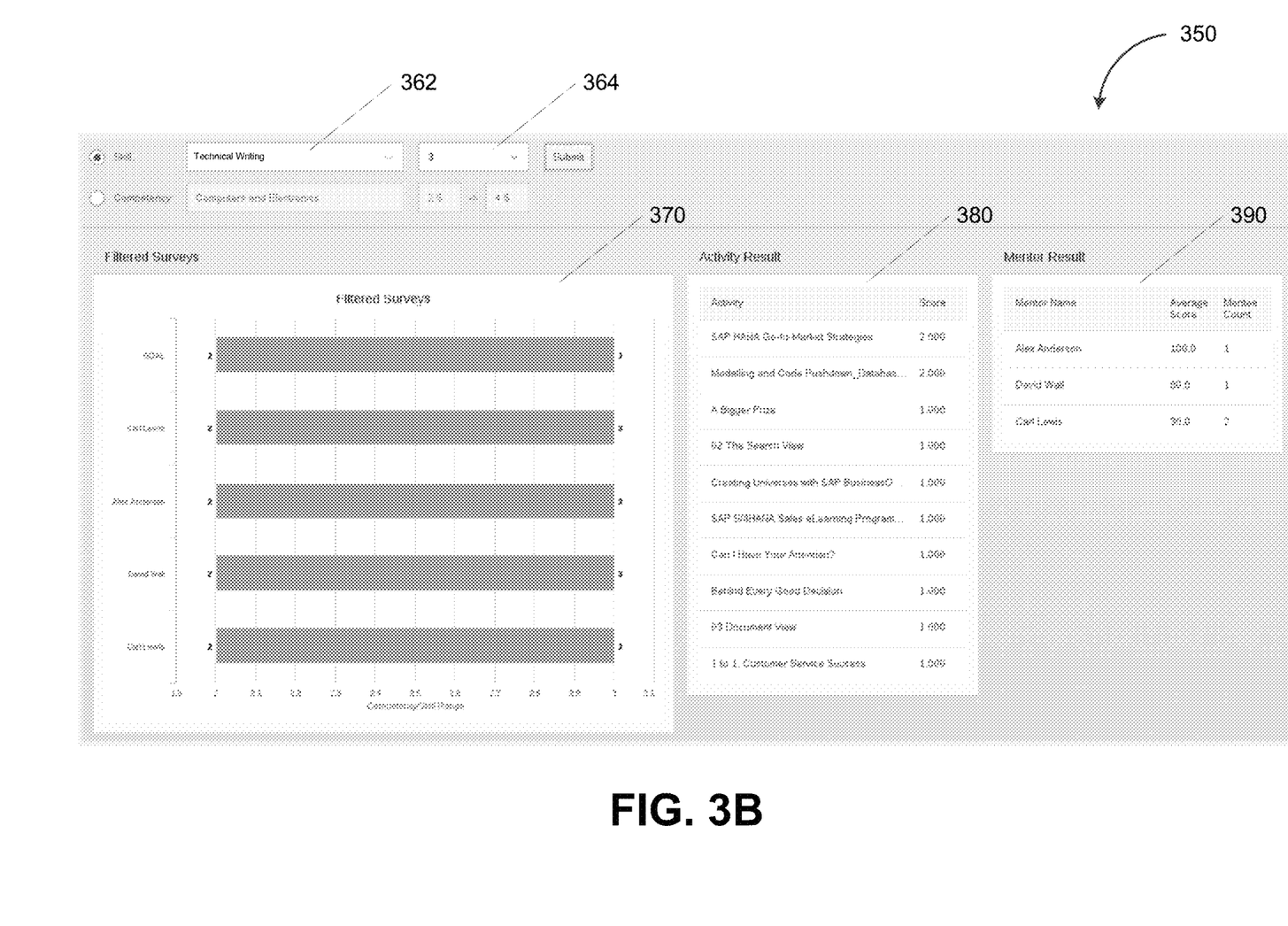
FIG. 3B depicts another user interface, in accordance with some example embodiments.

FIG. 3B depicts a user interface 350, in accordance with some example embodiments. Referring to FIGS. 1-2 and 3B, the controller 110 may generate the user interface 350 based on one or more of the records selected by the record selector 212. For example, the record selector 212 may generate one or more queries that filter the records held at the database 140 based on the target skill level of 3 for Technical Writing input by the client 120 via, for instance, a first input box 362 and a second input box 364. The controller 110 may generate the user interface 350 for display at the client 120. As shown in FIG. 3B, the user interface 350 may display mentors and mentoring activities that satisfy the target skill level of 3 for Technical Writing, which may be input received from the client 120. The first input box 362 and the second input box 364 may be implemented as text input boxes, dropdown menus, buttons, radio buttons, and/or the like.

The user interface 300 may include a filtered survey panel 370, an activity result panel 380, and a mentor result panel 390. The filtered survey panel 370 may display the skill level of at least some of the mentors and/or mentoring activities relative to the target skill level. The activity result panel 380 may display the mentoring activities that correspond to the activity profiles selected by the record selector 212. As noted earlier, the record selector 212 may select a top k quantity of activity profiles that satisfy the target skill level. In some example embodiments, the record selector 212 may select a top k quantity of activity profiles based on a repeat rate of each mentoring activity, which may correspond to an average number of times the mentoring activity is repeated by its participants. As such, the activity result panel 380 may include one or more mentoring activities with skill level of at least 3 for Technical Writing and with the lowest repeat rates.

The mentor result panel 390 may display the mentors that correspond to the mentor profiles selected by the record selector 212. According to some example embodiments, the record selector 212 may select a top k quantity of mentor profiles that satisfy the target competency range based on the rating of each mentor, which may correspond to an average rating given to the mentor by the mentor's mentees. As such, the mentor result panel 390 may include one or more mentors with a skill level of at least 3 for Technical writing and with the highest ratings.

Figure 4A:
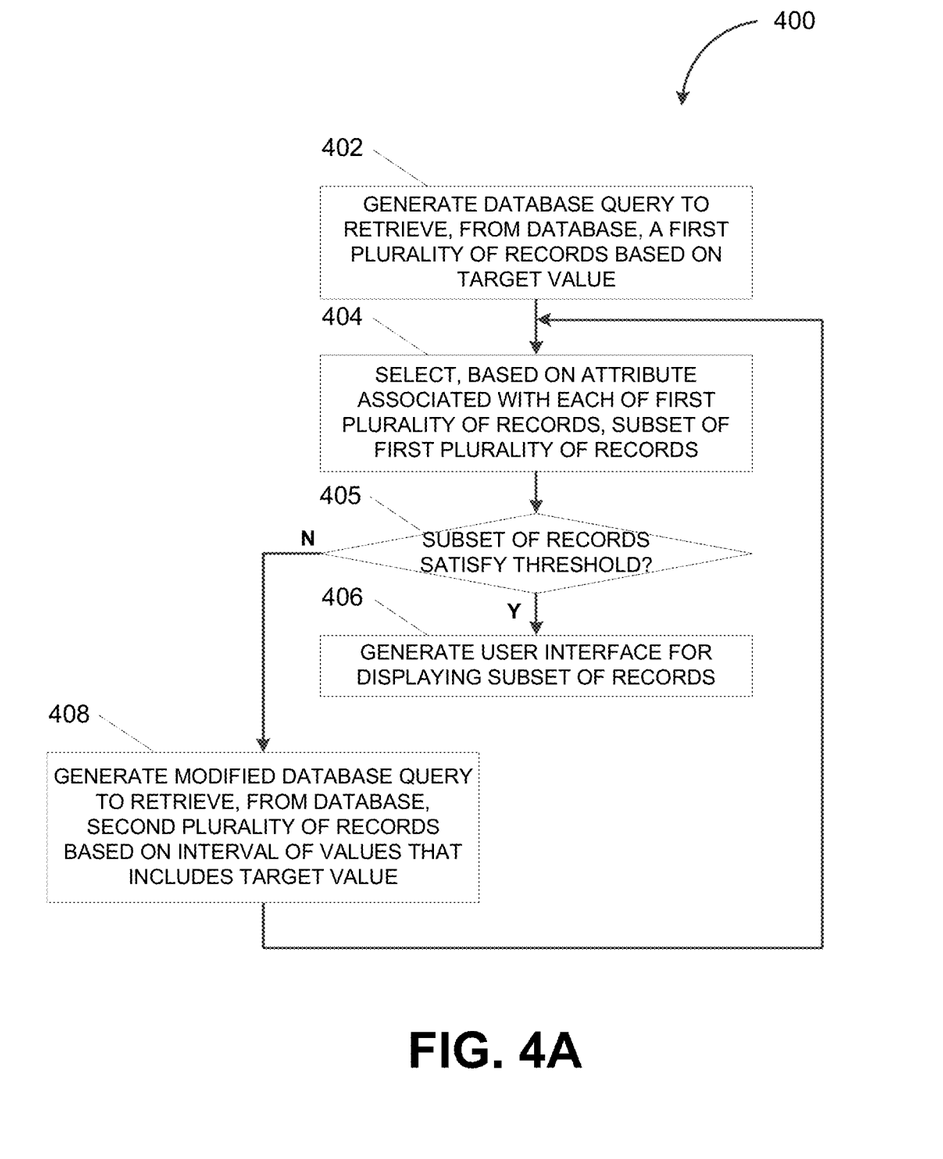
FIG. 4A depicts a flowchart illustrating a process for target value-based querying, in accordance with some example embodiments.

FIG. 4A depicts a flowchart illustrating a process 400 for target value-based querying, in accordance with some example embodiments. Referring to FIGS. 1-2, 3A-B, and 4A, the process 400 may be performed by the controller 110.

At 402, the controller 110 may generate a database query to retrieve, from the database 140, a first plurality of records based on a target value. In some example embodiments, the target value may correspond to a target skill level specified by the client 120. As such, the controller 110 may generate the database query to retrieve records, such as mentor profiles and/or activity profiles, satisfying the target skill level. For example, the mentor profiles may be associated with mentors whose skill level is equal to or greater than the target skill level. Alternately and/or additionally, the activity profiles may be associated with mentoring activities that enable participants to achieve the target skill level.

At 404, the controller 110 may select, based at least on an attribute associated with each of the first plurality of records, a subset of records from the first plurality of records. For example, the controller 110 may sort the one or more mentor profiles retrieved at operation 402 based on the mentor rating associated with each mentor profile. The controller 110 may select, from the sorted mentor profiles, a k number of mentor profiles having the highest ratings. The ratings may be weighed based on the similarity index associated with each mentor profile. Alternately and/or additionally, the controller 110 may sort the one or more activity profiles retrieved at operation 402 based on the repeat rate associated with each activity profile. The controller 110 may select, from the sorted activity profiles, a k number of activity profiles having the lowest repeat rates.

At 405, the controller 110 may determine whether the subset of records satisfy a threshold value. For example, the controller 110 may determine whether the ratings associated with the top k number of mentor profiles selected at operation 404 exceed a minimum rating. Alternately and/or additionally, the controller 110 may determine whether the repeat rates associated with the top k number of activity profiles selected at operation 404 are below a maximum repeat rate.

At 405-Y, the controller 110 may determine that the subset of records satisfy the threshold value. As such, at 406, the controller 110 may generate a user interface for displaying at least a portion of the subset of records. For example, the controller 110 may determine that the rating associated with at least some of mentor profiles selected at operation 404 exceed a minimum rating. Alternately and/or additionally, the controller 110 may determine that the repeat rate associated with at least some of the activity profiles selected at operation 404 is below a maximum repeat rate. Accordingly, the controller 110 may generate a user interface, such as the user interface 350, to display at least some of the mentor profiles and/or activity profiles selected at operation 404.

Alternately and/or additionally, at 405-N, the controller 110 may determine that the subset of records do not satisfy the threshold value. As such, at 408, the controller 110 may generate a modified database query to retrieve, from the database 140, a second plurality of records based on an interval of values that includes the target value. The process 400 may further continue at operation 404 wherein the controller 110 may select a top k quantity of the one or more records retrieved from the database 140 based on the interval. For example, the controller 110 may determine that the ratings associated with the mentor profiles selected at operation 404 do not exceed a minimum rating. Alternately and/or additionally, the controller 110 may determine that the repeat rates associated with at least some of the activity profiles selected at operation 404 are not below a maximum repeat rate. Accordingly, the controller 110 may generate a modified database query by at least expanding the original target skill level into an interval that includes the original target skill level. Querying the database 140 based on the interval may retrieve a larger number of records from which to select a top k quantity of records. As such, the controller 140 may be able to select a top k quantity of records that do satisfy the threshold value.

Figure 4B:
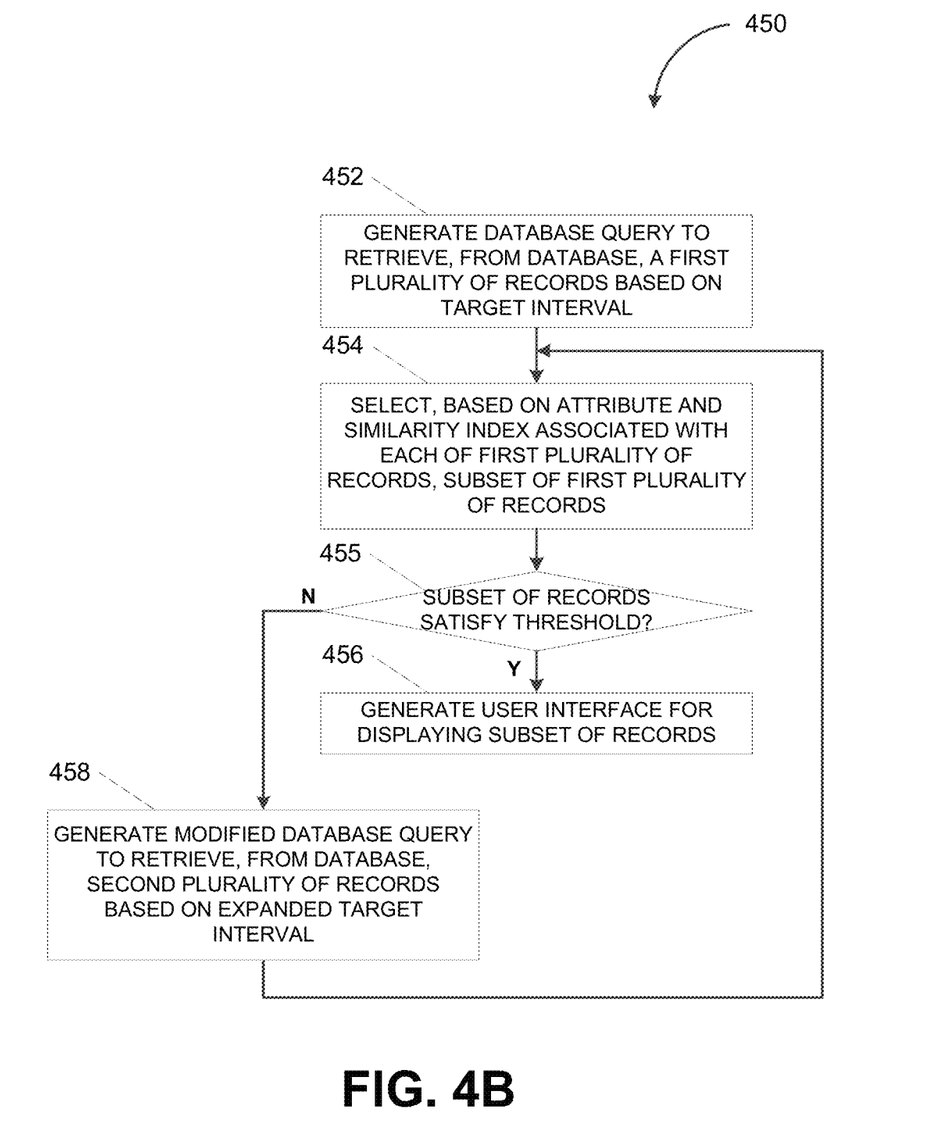
FIG. 4B depicts a flowchart illustrating a process for target interval-based querying, in accordance with some example embodiments.

FIG. 4B depicts a flowchart illustrating a process 450 for target interval-based querying, in accordance with some example embodiments. Referring to FIGS. 1-2, 3A-B, and 4B, the process 400 may be performed by the controller 110.

At 452, the controller 110 may generate a database query to retrieve, from the database 140, a first plurality of records based on a target interval. In some example embodiments, the target interval may correspond to a target competency range specified by the client 120. As such, the controller 110 may generate the database query to retrieve records, such as mentor profiles and/or activity profiles, satisfying the target competency range. For example, the mentor profiles may be associated with mentors whose competency range overlaps with the target competency range. Alternately and/or additionally, the activity profiles may be associated with mentoring activities that enable participants to achieve a competency range that overlaps the target competency range.

At 454, the controller 110 may select, based on an attribute and a similarity index associated with each of the first plurality of records, a subset of the first plurality of records. For example, the controller 110 may sort the one or more mentor profiles retrieved at operation 402 based on the mentor rating associated with each mentor profile. These mentor ratings may be weighed based on the similarity index associated with each mentor profile. As noted earlier, the similarity index for a mentor profile may correspond to an amount of overlap between the mentor's competency range and the target competency range. The controller 110 may select, from the sorted mentor profiles, a k number of mentor profiles having the highest weighed ratings. Alternately and/or additionally, the controller 110 may sort the one or more activity profiles retrieved at operation 402 based on the repeat rate associated with each activity profile. The repeat rate associated with an activity profile may also be weighed based on a similarity index indicative of an amount of overlap between the target competency range and the competency range that may be achieved by completing the mentoring activity. The controller 110 may select, from the sorted activity profiles, a k number of activity profiles having the lowest weighed repeat rates.

At 455, the controller 110 may determine whether the subset of records satisfy a threshold value. For example, the controller 110 may determine whether the ratings associated with the top k number of mentor profiles selected at operation 454 exceed a minimum rating. Alternately and/or additionally, the controller 110 may determine whether the repeat rates associated with the top k number of activity profiles selected at operation 454 are below a maximum repeat rate.

At 455-Y, the controller 110 may determine that the subset of records satisfy the threshold value. As such, at 456, the controller 110 may generate a user interface for displaying at least a portion of the subset of records. For example, the controller 110 may determine that the rating associated with at least some of mentor profiles selected at operation 454 exceed a minimum rating. Alternately and/or additionally, the controller 110 may determine that the repeat rate associated with at least some of the activity profiles selected at operation 454 is below a maximum repeat rate. Accordingly, the controller 110 may generate a user interface, such as the user interface 300, to display at least some of the mentor profiles and/or activity profiles selected at operation 404.

Alternately and/or additionally, at 455-N, the controller 110 may determine that the subset of records do not satisfy the threshold value. As such, at 458, the controller 110 may generate a modified database query to retrieve, from the database 140, a second plurality of records based on an expanded target interval. The process 450 may further continue at operation 454 wherein the controller 110 may select a top k quantity of the one or more records retrieved from the database 140 based on the expanded target interval. For example, the controller 110 may determine that the ratings associated with the mentor profiles selected at operation 454 do not exceed a minimum rating. Alternately and/or additionally, the controller 110 may determine that the repeat rates associated with at least some of the activity profiles selected at operation 454 are not below a maximum repeat rate. Accordingly, the controller 110 may generate a modified database query by at least expanding the original target competency range. For example, the controller may decrease the lower bound and/or increase the upper bound of the original target competency range. Querying the database 140 based on the expanded interval may retrieve a larger number of records from which to select a top k quantity of records. As such, the controller 140 may be able to select a top k quantity of records that do satisfy the threshold value.

Figure 5:
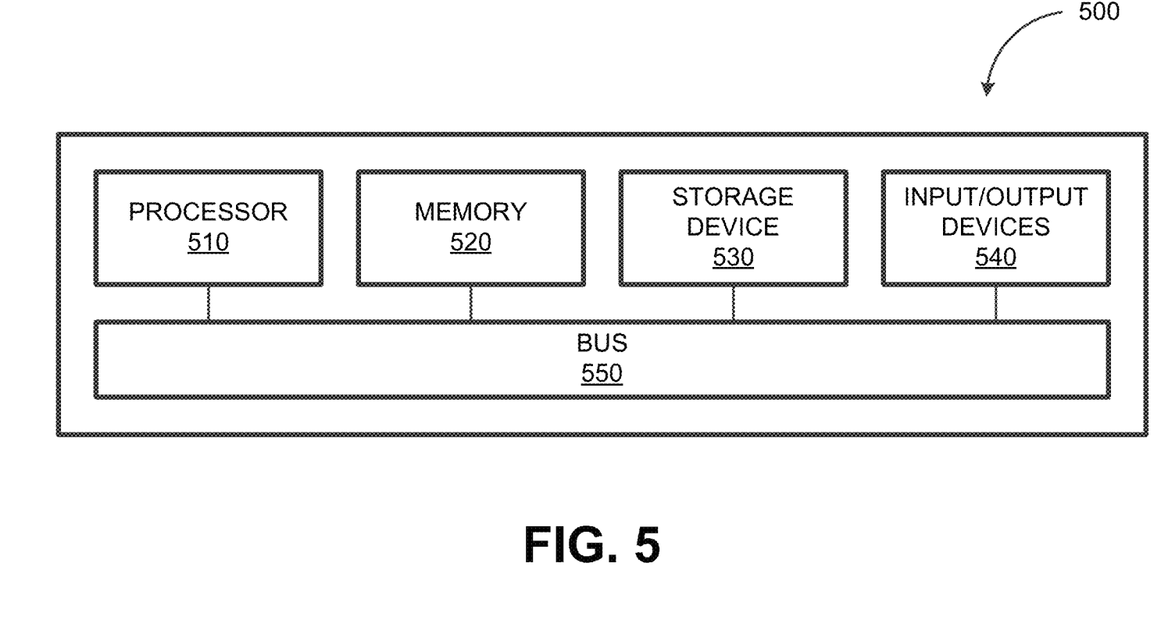
FIG. 5 depicts a block diagram illustrating a computing system, in accordance with some example embodiments.

FIG. 5 depicts a block diagram illustrating a computing system 500 consistent with implementations of the current subject matter. Referring to FIGS. 1 and 5, the computing system 500 can be used to implement the controller 110 and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the controller 110. In some implementations of the current subject matter, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

According to some implementations of the current subject matter, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some implementations of the current subject matter, the computing system 500 can be used to execute various interactive computer software applications that can be used for organization, analysis and/or storage of data in various (e.g., tabular) format (e.g., Microsoft Excel®, and/or any other type of software). Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning add-in for Microsoft Excel as part of the SAP Business Suite, as provided by SAP SE, Walldorf, Germany) or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
   generating, by a controller, a database query to retrieve a first set of records from a database, the database query configured to retrieve the first set of records by at least filtering, based on a first target value, a plurality of records held at the database, the plurality of records being associated with at least one attribute;
   selecting, by the controller, a subset of records from the first set of records, the selecting based at least on a first attribute associated with the first set of records;
   modifying, by the controller, the first target value by at least replacing a single value comprising the first target value with an interval of values that includes the single value, the first target value being modified in response the first attribute associated with the subset of records failing to satisfy a threshold value;
   executing, by the controller, a modified database query that includes the modified target value, the modified database query being executed to retrieve, based at least on the expanded target value, a second set of records from the database that includes at least one additional record not included in the first set of records, and the second set of records being retrieved by at least filtering, based on the modified target value, the plurality of records held at the database;
   generating, by the controller, another subset of records by at least selecting, based at least on a second attribute associated with the second set of records, the other subset of records from the second set of records, the selecting based on a similarity index corresponding to a quantity of overlap between the second attribute value and a second target value, and the selecting includes excluding one or more records based at least on the first attribute of the one or more records satisfying the threshold value but the similarity index of the one or more records failing to satisfy another threshold value; and
   generating, by the controller, a user interface configured to display a result of the database query and/or the modified database query, the result including the other subset of records.

2. The computer-implemented method of claim 1, wherein the database query is configured to retrieve the first set of records based at least on the second attribute associated with the first set of records being greater than the single value comprising the target value.

3. The computer-implemented method of claim 1, wherein the database query is configured to retrieve the first set of records based at least on the second attribute associated with the first set of records overlapping with the target value.

4. The computer-implemented method of claim 1, further comprising:
   expanding the interval of values by at least decreasing a lower bound of the interval of values and/or increasing an upper bound of the interval of values, the interval of values being expanded to further increase a quantity of records included in the second set of records.

5. The computer-implemented method of claim 1, further comprising:
   determining a quantity of values that appear in the second attribute associated with the second set of records and another interval of values comprising the second target value;
   determining a total quantity of values in the second attribute associated with the second set of records and in the other interval of values; and
   determining, based at least on the quantity of values and the total quantity of values, the similarity index for the second set of records.

6. The computer-implemented method of claim 1, wherein the subset of records is selected by at least weighing, based on a corresponding similarity index, the second attribute associated with the second set of records.

7. The computer-implemented method of claim 1, wherein the threshold value comprises a first minimum value and/or a first maximum value for the first attribute associated with the subset of records, and wherein the other threshold value comprises a second minimum value and/or a second maximum value associated with the second set of records.

8. The computer-implemented method of claim 1, wherein the controller is implemented as a cloud service accessible to a first client and a second client, the first client accessing a first instance of the controller, and the second client accessing a second instance of the controller.

9. A system, comprising:
at least one data processor; and
at least one memory storing instructions which, when executed by the at least one processor, result in operations comprising:
generating, by a controller, a database query to retrieve a first set of records from a database, the database query configured to retrieve the first set of records by at least filtering, based on a first target value, a plurality of records held at the database, the plurality of records being associated with at least one attribute;
selecting, by the controller, a subset of records from the first set of records, the selecting based at least on a first attribute associated with the first set of records;
modifying, by the controller, the first target value by at least replacing a single value comprising the first target value with an interval of values that includes the single value, the first target value being modified in response the first attribute associated with the subset of records failing to satisfy a threshold value;
executing, by the controller, a modified database query that includes the modified target value, the modified database query being executed to retrieve, based at least on the expanded target value, a second set of records from the database that includes at least one additional record not included in the first set of records, and the second set of records being retrieved by at least filtering, based on the modified target value, the plurality of records held at the database;
generating, by the controller, another subset of records by at least selecting, based at least on a second attribute associated with the second set of records, the other subset of records from the second set of records, the selecting based on a similarity index corresponding to a quantity of overlap between the second attribute value and a second target value, and the selecting includes excluding one or more records based at least on the first attribute of the one or more records satisfying the threshold value but the similarity index of the one or more records failing to satisfy another threshold value; and
generating, by the controller, a user interface configured to display a result of the database query and/or the modified database query, the result including the other subset of records.

10. The system of claim 9, wherein the database query is configured to retrieve the first set of records based at least on the second attribute associated with the first set of records being greater than the single value comprising the target value.

11. The system of claim 9, wherein the database query is configured to retrieve the first set of records based at least on the second attribute associated with the first set of records overlapping with the target value.

12. The system of claim 9, further comprising:
expanding the interval of values by at least decreasing a lower bound of the interval of values and/or increasing an upper bound of the interval of values, the interval of values being expanded to further increase a quantity of records included in the second set of records.

13. The system of claim 9, further comprising:
determining a quantity of values that appear in the second attribute associated with the second set of records and another interval of values comprising the second target value;
determining a total quantity of values in the second attribute associated with the second set of records and in the other interval of values; and
determining, based at least on the quantity of values and the total quantity of values, the similarity index for the second set of records.

14. The system of claim 9, wherein the subset of records is selected by at least weighing, based on a corresponding similarity index, the second attribute associated with the second set of records.

15. The system of claim 9, wherein the threshold value comprises a first minimum value and/or a first maximum value for the first attribute associated with the subset of records, and wherein the other threshold value comprises a second minimum value and/or a second maximum value associated with the other subset of records.

16. A non-transitory computer-readable storage medium including program code, which when executed by at least one data processor, cause operations comprising:
generating, by a controller, a database query to retrieve a first set of records from a database, the database query configured to retrieve the first set of records by at least filtering, based on a first target value, a plurality of records held at the database, the plurality of records being associated with at least one attribute;
selecting, by the controller, a subset of records from the first set of records, the selecting based at least on a first attribute associated with the first set of records;
modifying, by the controller, the first target value by at least replacing a single value comprising the first target value with an interval of values that includes the single value, the first target value being modified in response the first attribute associated with the subset of records failing to satisfy a threshold value;
executing, by the controller, a modified database query that includes the modified target value, the modified database query being executed to retrieve, based at least on the expanded target value, a second set of records from the database that includes at least one additional record not included in the first set of records, and the second set of records being retrieved by at least filtering, based on the modified target value, the plurality of records held at the database;
generating, by the controller, another subset of records by at least selecting, based at least on a second attribute associated with the second set of records, the other subset of records from the second set of records, the selecting based on a similarity index corresponding to a quantity of overlap between the second attribute value and a second target value, and the selecting includes excluding one or more records based at least on the first attribute of the one or more records satisfying the threshold value but the similarity index of the one or more records failing to satisfy another threshold value; and generating, by the controller, a user interface configured to display a result of the database query and/or the modified database query, the result including the other subset of records.

* * * * *